United States Patent
Zhang et al.

(10) Patent No.: US 11,930,013 B1
(45) Date of Patent: Mar. 12, 2024

(54) ACCESS CONTROL LIST (ACL) BASED STATIC ANALYSIS OF SOFTWARE APPLICATION ARTIFACTS

(71) Applicant: Amazon Technologies, Inc., Seattle, WA (US)

(72) Inventors: Jiangtao Zhang, Pleasanton, CA (US); Roland Mesde, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 769 days.

(21) Appl. No.: 17/102,164

(22) Filed: Nov. 23, 2020

(51) Int. Cl.
*G06F 8/41* (2018.01)
*G06F 9/54* (2006.01)
*G06F 16/901* (2019.01)
*H04L 9/40* (2022.01)

(52) U.S. Cl.
CPC ............ *H04L 63/101* (2013.01); *G06F 8/433* (2013.01); *G06F 9/547* (2013.01); *G06F 16/9024* (2019.01)

(58) Field of Classification Search
None
See application file for complete search history.

(56) References Cited

U.S. PATENT DOCUMENTS

| | | | |
|---|---|---|---|
| 5,758,153 A * | 5/1998 | Atsatt | G06F 16/289 |
| 6,792,595 B1 * | 9/2004 | Storistenau | G06F 8/33 717/109 |
| 11,422,797 B1 * | 8/2022 | Zhang | G06F 8/72 |
| 2002/0026592 A1 * | 2/2002 | Gavrila | G06F 21/6218 709/229 |
| 2011/0145805 A1 * | 6/2011 | Taylor | G06Q 30/02 707/812 |
| 2013/0055205 A1 | 2/2013 | Sereni et al. | |
| 2019/0278955 A1 * | 9/2019 | Mani | G06K 7/10366 |

* cited by examiner

*Primary Examiner* — Marina Lee
(74) *Attorney, Agent, or Firm* — Nicholson DeVos Webster & Elliott LLP

(57) ABSTRACT

Techniques are described for providing an access control list (ACL) assisted process for filtering the analysis and display of dependency relationships among software application components (e.g., packages, files, classes, etc.), e.g., as part of modernization processes aimed at decomposing monolithic applications, identifying anti-patterns, or otherwise analyzing such applications. A software modernization service of a cloud provider network provides discovery agents and other tools that are capable of creating an inventory of users' software applications and collecting application artifacts (e.g., source code or bytecode files) associated with the software applications in users' computing environments. Various techniques are described for using ACLs containing entries enabling or disabling the analysis or display of various application components to customize various modernization processes and results displays.

20 Claims, 8 Drawing Sheets

ACCESS CONTROL LIST (ACL) BASED STATIC ANALYSIS OF SOFTWARE APPLICATION ARTIFACTS

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially millions of users, have global availability, manage very large amounts of data, and respond to requests in milliseconds. The processes for upgrading, converting, rewriting, etc., such applications to enable improved performance is referred to generally as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
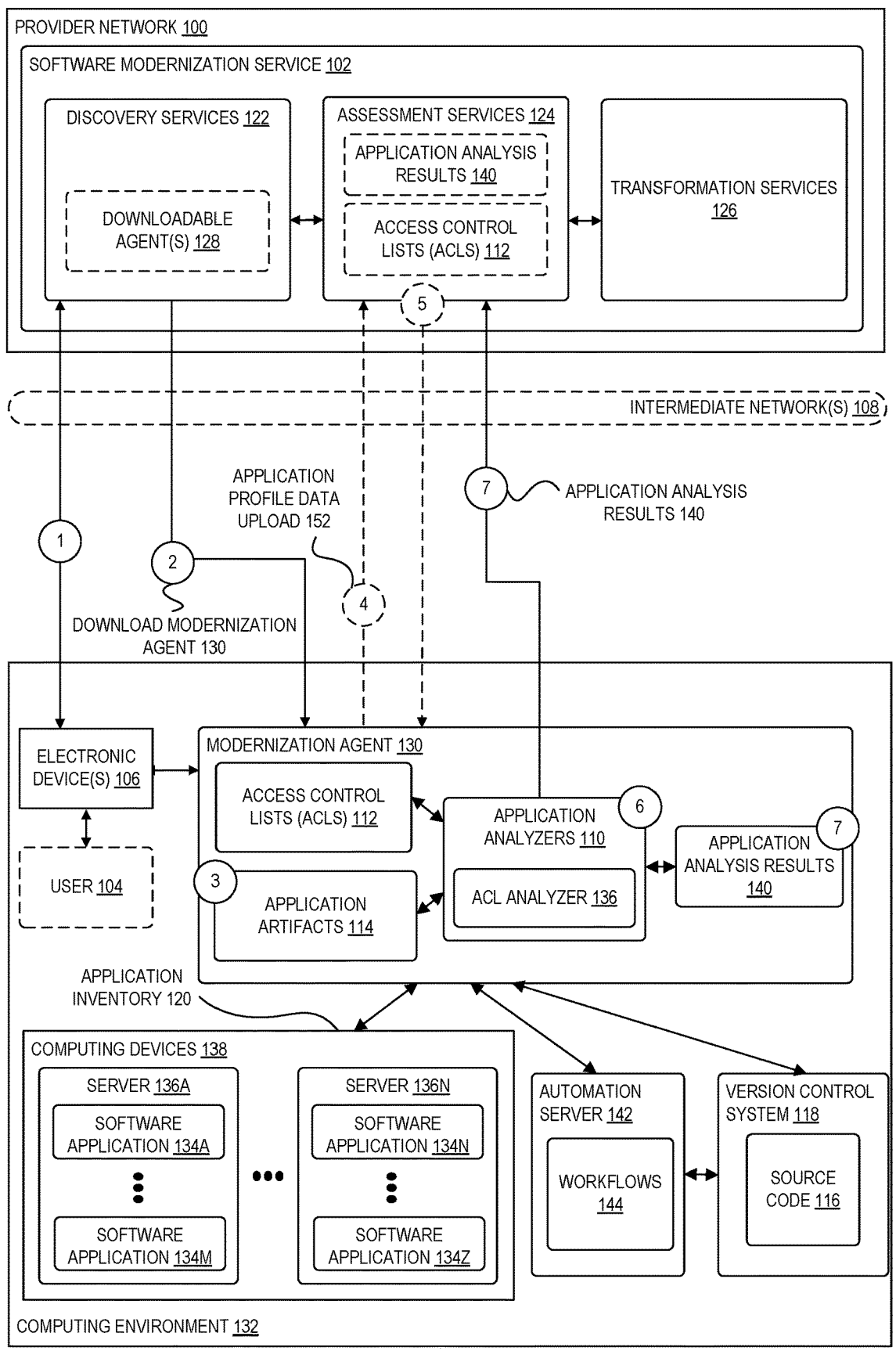
FIG. 1 is a diagram illustrating a computing environment that enables a software modernization system of a cloud provider network to perform access control list (ACL) assisted static and dynamic analyses of software applications undergoing modernization processes according to some embodiments.

The present disclosure relates to methods, apparatus, systems, and non-transitory computer-readable storage media for using access control lists (ACLs) to filter analyses of software applications and corresponding displays of analysis results. For example, the analysis of a software application can include identifying static dependency relationships among software application components (e.g., packages, files, classes, etc.), identifying dynamic dependencies at runtime, or identifying anti-patterns associated with an application's implementation, e.g., as part of various software modernization processes aimed at migrating software applications to modernized architectures. In some embodiments, a software modernization service of a cloud provider network provides discovery agents and other tools capable of creating an inventory of software applications in users' computing environments and collecting application artifacts (e.g., source code, bytecode, intermediate language files, or other artifacts) associated with the implementation of the applications. According to embodiments described herein, various techniques are described for using ACLs containing entries enabling or disabling the analysis or display of various application components to customize various modernization processes and results displays.

Software modernization broadly refers to converting, rewriting, or porting legacy software applications or systems to more modern computer programming languages, software libraries, protocols, hardware platforms, application architectures, cloud-based services, and the like. Users, business organizations, and other entities often desire to modernize their various software applications and systems to improve operational performance, to increase application availability, to reduce exposure to vulnerabilities (e.g., software crashes, security vulnerabilities, etc.), to migrate applications from non-cloud environments to infrastructure provided by a cloud services provider (e.g., to leverage a cloud service's provider reliable infrastructure, increased performance benefits, etc.), and to enable more efficient ongoing development of the applications, among other possible reasons.

The software modernization process often begins with identifying an inventory of software applications in a user's computing environment that may be candidates for various modernization efforts. As indicated above, a user might use a discovery agent or other tool installed in the user's environment to automatically identify applications within the user's environment, e.g., by identifying and analyzing applications executing on various servers throughout the user's computing environment accessible to the agent. A user might further provide access to various artifacts (e.g., source code or bytecode files) associated with the applications, or the agent might automatically identify and obtain the artifacts, to analyze the existing implementation of a software application.

Once such application artifacts are identified, in some embodiments, analyses of the source code, bytecode, or other artifacts are used to identify application components (e.g., packages, files, classes, methods, data objects, or other application abstractions) and the associated dependency relationships among the identified components. For example, identified dependency relationships among such components can be used to generate a graph model representing a software application's implementation structure. Such a graph model can then be used, e.g., to identify independent application components of a monolithic application that can be carved out as independently maintained and deployable components, to identify anti-patterns hindering the migration of the applications to a cloud-based environment, or for other purposes. The analysis of software applications in this manner typically however produces a significant amount of "noise" resulting from identified relationships involving commonly used standard libraries and third party libraries, where such relationships may not provide useful information about the structure of the code implementing application-specific functionality.

The aforementioned challenges, among others, are addressed by a software modernization application and system that provides an ACL-based filtering mechanism for analysis procedures and for displaying analysis results. For example, in some embodiments, an application analyzer uses software modernization service-provided or user-generated ACLs to limit a set of application components to be analyzed for dependency relationships used to generate a graph model of an application or perform other analyses. As another example, ACLs can be used to filter the display of a generated application graph model to show only those application components and associated relationships specified in an ACL to provide a clearer representation of an application's implementation structure. Among other benefits, the use of ACLs enables users to efficiently scope the analysis of applications undergoing modernization processes, thereby also improving the efficiency, robustness, scalability, and general performance of the associated software applications undergoing the modernization processes.

FIG. 1 is a diagram illustrating an environment that enables a software modernization service 102 of a cloud provider network 100 to use ACLs to filter the analysis of software application artifacts (e.g., source code and byte code) and corresponding displays of analysis results according to some embodiments. A provider network 100 (or "cloud" provider network) provides users with the ability to utilize one or more of a variety of types of computing-related resources such as compute resources (e.g., executing virtual machine (VMS) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc.

The users (or "customers") (e.g., a user 104) of provider networks 100 may utilize one or more user accounts that are associated with a customer account, though these terms may be used somewhat interchangeably depending upon the context of use. Users may interact with a provider network 100 via an electronic device (e.g., electronic device(s) 106) across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network 100 typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZs of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

The cloud provider network 100 typically includes other services in addition to the software modernization service 102. A hardware virtualization service, for example, (referred to in various implementations as an elastic compute service, a virtual machines service, a computing cloud service, a compute engine, or a cloud compute service), for example, can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, the cloud provider network 100 includes a container service. A container service can be a container orchestration and management service (referred to in various implementations as a container service, cloud container service, container engine, or container cloud service) that allows users of the cloud provider network to instantiate and manage containers. In some embodiments the container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

An on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service by uploading their code and using one or more APIs to request that the service identify, provision, and manage any resources required to run the code. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In some embodiments, a software modernization service 102 provides various types of software modernization services and functionality including discovery services 122, assessment services 124, and transformation services 126, collectively aimed at helping users to discover and use recommended transformation and migration paths for their software applications. The discovery services 122, for example, include various services, software applications, software agents, and other tools (e.g., including downloadable modernization agents 130) used to identify software applications in users' computing environments and to collect profile information for software applications undergoing modernization processes. The assessment services 124 enable users and applications to obtain various types of software modernization assessments and recommendations, e.g., based on application artifacts (e.g., source code and bytecode) collected for users' applications by the discovery services 122 and associated tools. For example, the recommendations generated by an assessment service 124 can include recommended modernization strategies, recommended modernization tools, estimated modernization costs, etc.

As indicated above, according to embodiments described herein, a software modernization service 102 enables the use of ACLs (e.g., ACLs 112) to filter static and dynamic analysis procedures and the display of results via a modernization agent 130, assessment service 124, or other tools. For example, in some embodiments, a modernization agent 130 includes one or more application analyzers 110 configured to statically or dynamically analyze application artifacts (e.g., application artifacts 114 including source code, bytecode, or intermediate code files) obtained for software applications undergoing analysis (e.g., any of software applications 134A-134Z running on servers 136A-136N or computing devices 138). In some embodiments, based on the analyses, the application analyzer 110 generates application analysis results 140, e.g., including graph-based models of dependency relationships among application components (e.g., packages, classes, methods, variables, etc.), data identifying detected anti-patterns, and the like. According to embodiments described here, the particular application components (e.g., particular packages, classes, methods, data objects) included in such analyses or results displays can be filtered using ACLs 112, where the ACLs can be provided by a software modernization service 102 or customized by a user to obtain more relevant application analysis results 140, among other uses.

In some embodiments, a modernization agent 130 collects dynamic runtime information about discovered software applications including, e.g., process identifiers, runtime artifacts such as binary executables, JAR files, DLL files, etc. A modernization agent 130 can further collect source code 116, for example, stored in a version control system 118 or other storage location within the user's computing environment 132 or elsewhere. In some embodiments, a user provides a modernization agent 130, software modernization service 102, or both, with authentication information (e.g., a username and password, security token, etc.) that can be used to access the version control system based on a URL or other access identifier.

In FIG. 1, the circles labeled "1"-"7" illustrate an example process in which a user obtains a modernization agent 130 used to inventory and analyze software applications in the user's computing environment using ACLs 112 to filter the analysis and corresponding results displays. In some embodiments, at circle "1" in FIG. 1, a user accesses the software modernization service 102 (for example, via various interfaces provided by discovery services 122) to obtain information about available modernization services and tools and to download one or more downloadable agents 128. In some embodiments, at circle "2," a modernization agent 130 is downloaded and installed on servers within a user's on-premises computing environment 134 (e.g., on a physical server or VM). In some embodiments, users (e.g., a user 104) can use a computing device 106 to interact with the modernization agent 130 via a command line interface (CLI), graphical user interface (GUI), or any other type of interface provided by the modernization agent 130.

For example, at the circle labeled "2" in FIG. 1, a user 120 has obtained and installed the modernization agent 130, which may include one or more application analyzer(s) 110, on a computing device within the user's computing environment 132 (e.g., at an on-premises datacenter, corporate network, or other type of user computing environment) to assist with modernizing one or more software applications 134A-134Z running in the user's computing environment 132. The software applications 134A-134N, for example, may include one or more applications deployed on one or more Linux®-based or Windows®-based hosts and generally represent any type of software that may be executing in a computing environment (e.g., software implementing a web application or service, business application software, etc.). Each of the software applications can be a single process or a group of interoperating processes and may execute within a virtualized or non-virtualized execution environment (e.g., the Java® virtual machine (JVM) in the case of a Java application, or any other execution environment for other types of applications).

As part of a modernization assessment process, in some embodiments, at circle "3," a user invokes an inventory command provided by an modernization agent 130 and used to identify applications within the user's computing environment 132 that can be assessed (e.g., including some or all of software applications 134A-134Z in the example of FIG. 1), to collect application artifacts 114 related to the identified applications, and to optionally perform various preliminary analyses of the identified applications. In some embodiments, instead of interacting directly with the modernization agent 130, the user 104 may instead interact with a web-based console or other interface provided by the software modernization service 102. The software modernization service 102 may then in turn instruct an modernization agent 130 or other application running in the user computing environment 132 to perform some or all of the inventory 120 operations described in reference to FIG. 1 such as, for example, identifying an inventory of applications, obtaining application artifacts 114 for the applications (e.g., including source code 116, binary executable file information identifying JAR files, DLL files, process identifiers, intermediate language files, etc.), among other possible application profile information.

In some embodiments, a user 104 configures the modernization agent 130 with the ability to access an automation server 142 in the user's computing environment, the provider network 100, or elsewhere, e.g., to collect bytecode files or other types of application artifacts. In some embodiments, the automation server 142 broadly represents any type of server, service, application, or other tool that helps automate various software development processes such as, for example, building, testing, and deploying software applications. An automation server 142, for example, may automate such processes in an effort to facilitate a continuous integration and continuous delivery approach to software development and deployment. In some embodiments, the automation server 142 is a server-based system that interfaces with version control tools (e.g., a version control system 118) to identify changes to a repository (e.g., code commits) or other events and may further include configurations used to automate one or more actions responsive to the detection of such events. In some embodiments, users can use an automation server 142 to configure any number of workflows 144 (sometimes also referred to as "jobs," "pipelines," or "projects"), each representing a defined configuration of automated processes for building, testing, and/ or deploying software applications. In this example, each workflow may be associated with a configuration file or other data that defines various actions, parameters (e.g., locations of source repositories, names of binary executable files to be generated, locations at which to store binary executable files, etc.). In some embodiments, an automation server 142 provides an interface (e.g., a network-accessible API) via which users and applications can request server-related information and perform various actions including, e.g., obtaining a list of configured workflows, obtaining configuration information associated with configured workflows, creating new workflows, etc.

In some embodiments, at circle "4," the modernization agent 130 optionally uploads the obtained application profile data 152 including identifiers of the discovered software applications in the user's computing environment 132. The assessment service 124 may use the uploaded application profile data, for example, to create a software application list that associates the identified software applications with a user account used by the user 104. The software application list, for example, may be displayed to a user in a GUI or other interface to provide a user with information about the discovered set of applications in the user's computing environment 132. In other embodiments, the application profile data is stored only locally by the modernization agent 130.

In some embodiments, at circle "5," either an assessment service 124 or modernization agent 130 initiates processes, at circle "6," to statically analyze or dynamically analyze a software application identified by the modernization agent 130. In some embodiments, the analysis of an identified software application is filtered using one or more ACLs 112, as described in more detail herein. In some embodiments, one or more ACLs 112 may be downloaded from the assessment services 124 or other external source. In some embodiments, for dynamic analyses, an ACL can be used to allow or deny the analysis of application components including, for example, servers, processes, websites, applications, executables, and the like. The ability to deny analysis access to certain application components, for example, can be used to filter out irrelevant components, to protect sensitive components or data, or for other reasons.

In some embodiments, an application analyzer 110 can also use ACLs to filter static analyses, e.g., used to identify static dependency relationships among application components (e.g., among packages, classes, methods, data objects, etc.) identified in various types of application artifacts. For example, an ACL can include entries each allowing or denying an application analyzer 110 access to certain components of the application, e.g., to filter out the analysis of standard or third party libraries, to filter out the analysis of sensitive application code or data, to focus the analysis on particular components of an application, or for other reasons. In some embodiments, an ACL analyzer 136 of the application analyzer 110 is used to parse any input ACLs and to instruct an application analyzer 110 to enable or disable the analysis of certain components of an application undergoing analysis.

In some embodiments, the application components of a software application are hierarchically organized such that enabling or disabling the analysis of certain application components also enables or disables the analysis of components organized hierarchically under the component. For example, a class may contain one or more methods, and a method may contain one or more data objects. Thus, an ACL enabling or disabling the analysis of the class also enables or disables the analysis of the contained methods and data objects. In this manner, users can scope the analysis performed by an application analyzer 110 by enabling or disabling analyses are different levels of the application component hierarchy.

In some embodiments, the ACLs 112 can include ACLs provided by the software modernization service 102 or by a user of the modernization agent 130. For example, a software modernization service 102 may provide a set of default ACLs customized for particular types of programming languages, application types, types of computing environments, etc., to enable or disable the analysis of certain components in such environments (e.g., to filter out the analysis of standard libraries or third party libraries commonly included in applications of a particular programming language). In some embodiments, an application analyzer 110 selects one or more ACLs 112 for use based on an identified programming language associated with a software application undergoing analysis or based on any other identified characteristics, where such ACLs may be packaged with the modernization agent 130 or requested from an assessment service 124 or other component of the software modernization service 102. Users can also customize, use, and share ACLs based on ACLs provided by an assessment service 124 or other entity.

In some embodiments, the following illustrates three separate ACLs used to filter the analysis of display of a software application by an application analyzer 110 or assessment service 124, where each ACL is identified by a separate number "1," "2," or "3" included with each entry:

```
access-list 1 deny package java.io
access-list 1 allow file test.java
access-list 1 allow class MyProjectClass
access-list 1 deny method WriteBytes
access-list 1 allow class.*(Foo|Bar).* #Regular expression in the value are supported
access-list 1 allow any
access-list 2 allow file test.java class TestClass method Handler
access-list 2 deny package com.csp file Main.java class Main method execute
access-list 2 deny any
access-list 3 allow server server1
access-list 3 deny process 987
access-list 3 allow application java
access-list 3 allow website mysite
access-list 3 deny exefile bash
access-list 3 allow any
```

As shown, the first ACL includes entries allowing the analysis or display of a particular file and class, while disabling the analysis of a particular method which may be contained in the class, among other entries. In some embodiments, the third ACL illustrates entries related to enabling or disabling aspects of a dynamic application analysis including, e.g., enabling analysis of a particular server, denying analysis of a particular process, and the like. In some embodiments, at circle "7," the application analyzer 110 generates application analysis results 140 such as a graph-based model, as described hereinafter.

Figure 2:
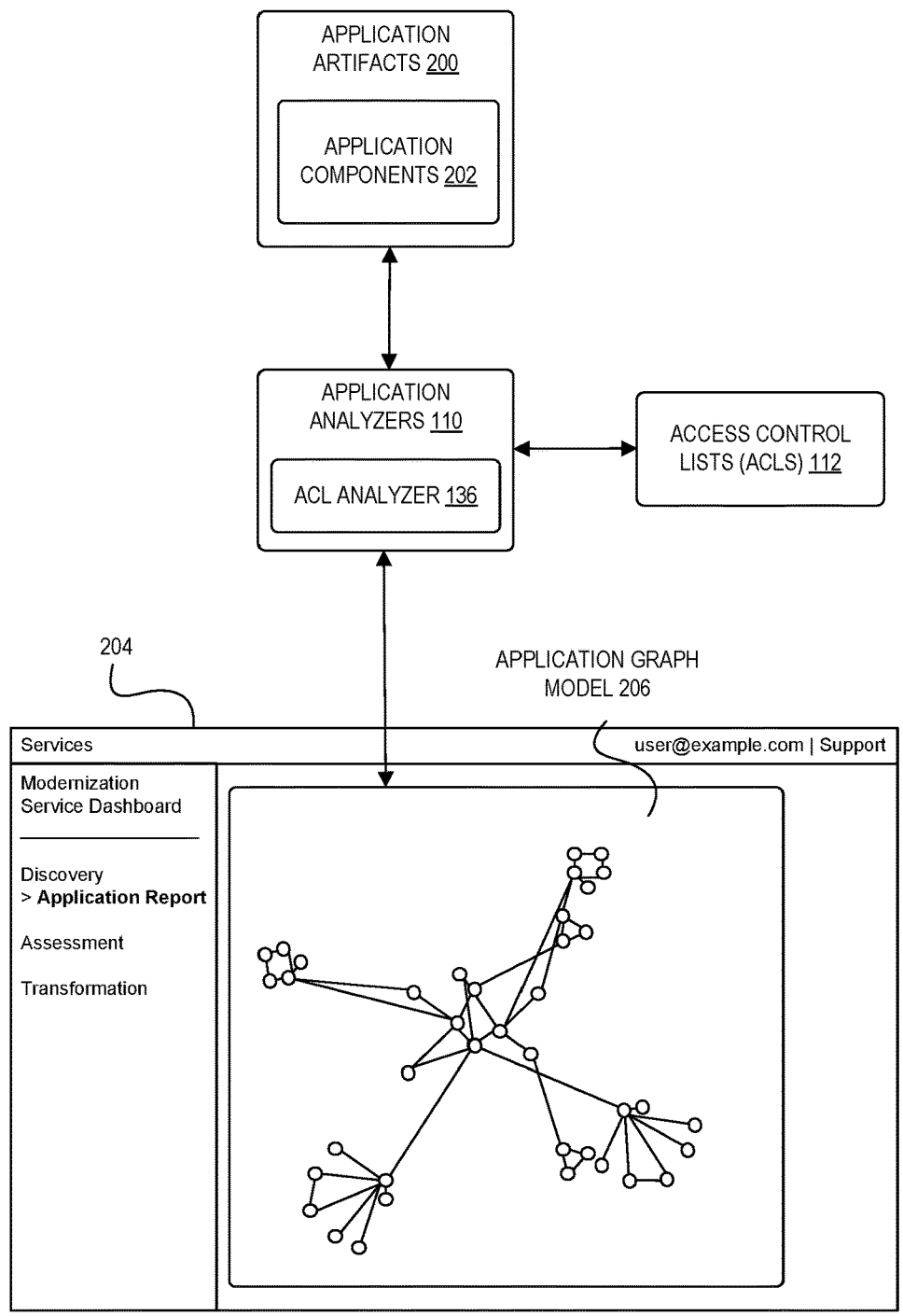
FIG. 2 is a diagram illustrating the display of a graph-based model based on an analysis of software application artifacts filtered by an ACL according to some embodiments.

FIG. 2 is a diagram illustrating the display of a graph-based model based on an analysis of software application artifacts filtered by one or more ACLs according to some embodiments. In some embodiments, application artifacts 200, including application components 202 (e.g., packages, classes, methods, data objects, etc.), is provided as input to an application analyzer 110 for analysis of component dependencies. In some embodiments, the analysis is filtered based on one or more ACLs 112, which may be obtained from a modernization service 102, included with a modernization agent 130, or provided by a user or other entity, by an ACL analyzer 136. For example, analysis of the application artifacts 200 by the application analyzer 110 includes ignoring application components of application components 202 denied by an ACL 112, analyzes application components 202 permitted by an ACL 112, or combinations thereof.

In this example, the output of the application analyzer 110 is a graph model representing identified dependency relationships among the application components 202, e.g., including a plurality of nodes each representing an application component of the application components (e.g., a package, class, method, data object, etc.) and edges each representing a dependency relationship between two application components (e.g., indicating that at least one of the application components is dependent on the other component). In some embodiments, a GUI 204 (e.g., a web-based console or standalone application GUI) can be displayed including a graphical representation of the graph model 206. In some embodiments, the nodes displayed in the graphical representation include nodes permitted for display by the ACL 112 and is displayed without nodes denied in the ACL. In some embodiments, other types of result displays can be generated such as lists of application components and associated dependencies, anti-patterns, refactoring costs, etc.

Figure 3:
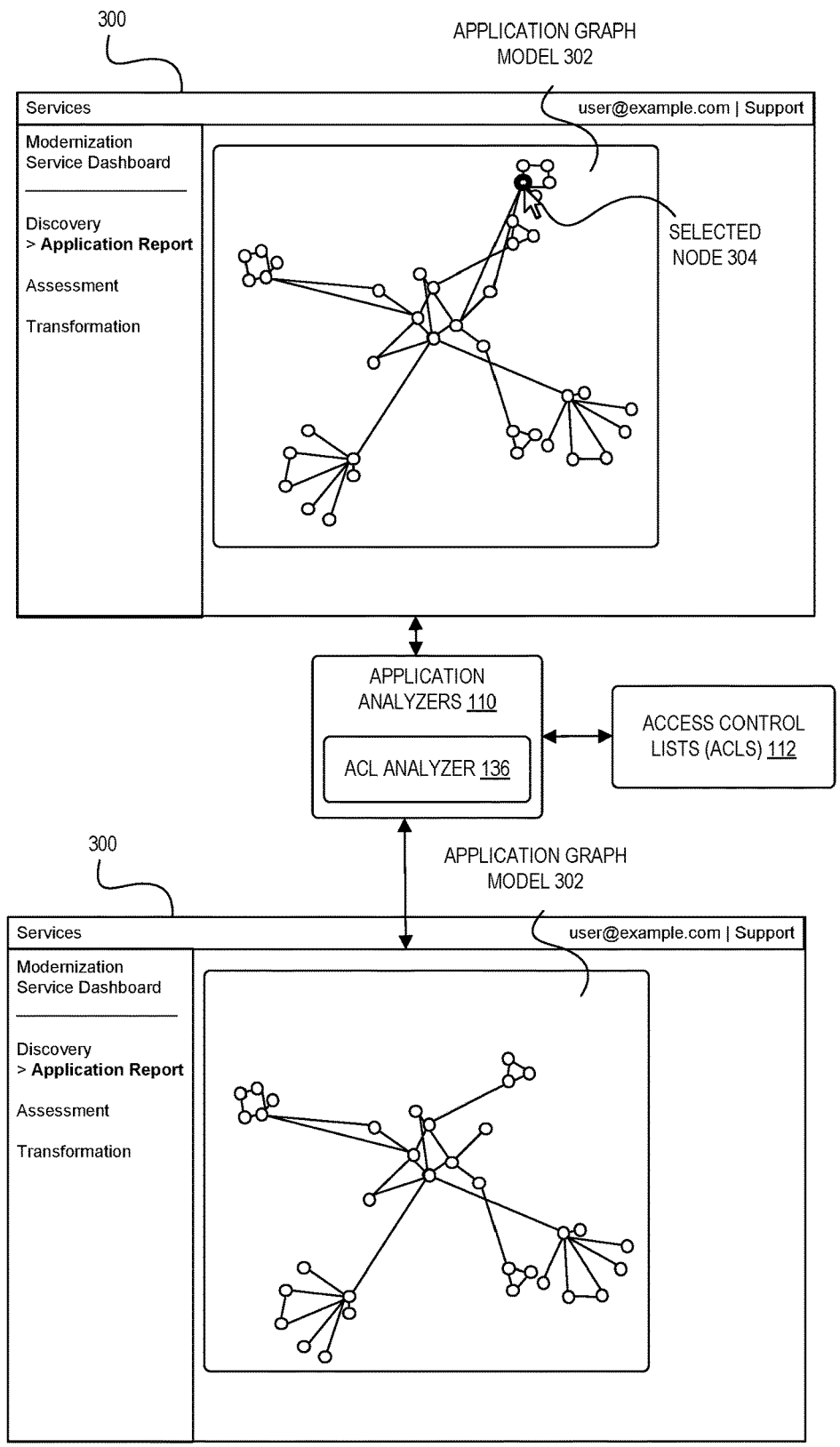
FIG. 3 is a diagram illustrating the use of an ACL to filter the display of analysis results according to some embodiments.

FIG. 3 is a diagram illustrating the use of ACLs to filter the display of analysis results according to some embodiments. As indicated above, an ACL can be used to filter the analysis or initial display of application components. In some embodiments, users can interact with and modify a results display and cause an associated ACL to be updated reflecting the user's modifications. For example, a user can provide input to hide or show selected application components of a generated graph-based model or other results display and a corresponding ACL can be updated so that the filtered display can be reused across other analysis processes for the same application or other applications.

For example, in FIG. 3, an interface 300 includes an initiate application graph model 302A reflecting analysis of a software application. In some embodiments, the interface 300 enables users to interact with the application graph model 302, e.g., to select particular nodes or edges of the graph and to provide input requesting to enable or disable the display of selected application components. In the example of FIG. 3, a user has provided input selecting a selected node 304 and further provided input requesting to disable display of the node (e.g., because the user believes that the selected application component is irrelevant to an analysis of the application's architecture).

In some embodiments, responsive to such user input, an application analyzer 110 or other component can update an ACL to reflect the user's request (e.g., to add an entry disabling display of the selected application component). In some embodiments, the user interface 300 also updates the display of the application graph model 302 to disable display of the selected application components as specified in the corresponding ACL 112. In some embodiments, the updated ACL is saved in association with a user directing the analysis processes (e.g., saved locally by a modernization agent 130 in by a software modernization service 102. In this manner, the user's filtered view of the application graph model 302 can be used across subsequent analyses or for other applications (e.g., other applications that may include a same application component). In some embodiments, the disabling of the display of the selected application component may also cause one or more other application components to be hidden in the updated display (e.g., because the other components are organized hierarchically under the selected application component).

Figure 4:
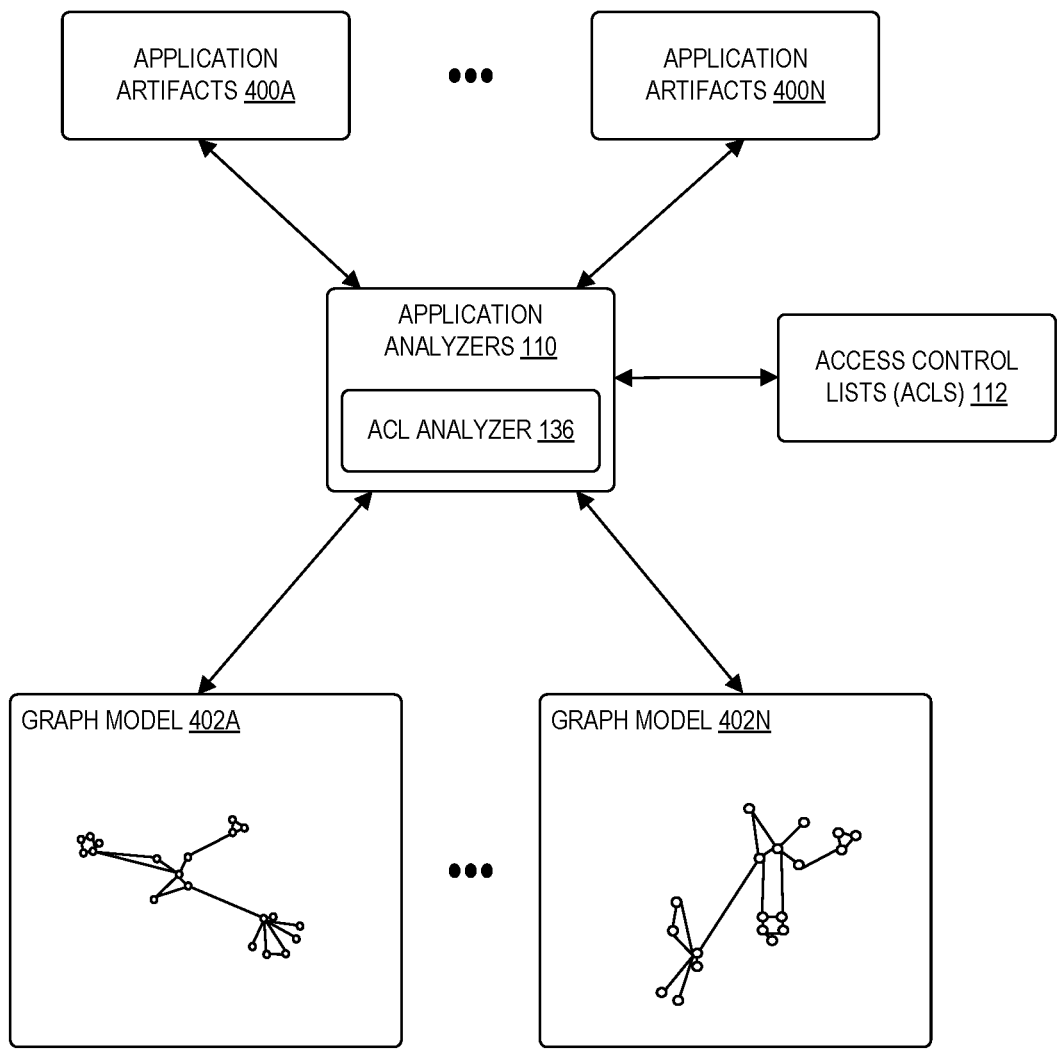
FIG. 4 is a diagram illustrating the reuse of ACLs across multiple analyses of a same or different software applications according to some embodiments.

FIG. 4 illustrates the reuse of ACLs across multiple analyses of a same application or different applications according to some embodiments. As shown, an application analyzer 110 may over time perform analyses on any number of separate collections of application artifacts 400A-400N, each corresponding to a different software application or version of a software application. In some embodiments, one or more same ACLs 112 can be saved and reused by a modernization agent 130 or software modernization service 102 to filter the analysis, display, or both of the separate application artifacts 400A. For example, ACLs can be developed to filter common standard libraries or third party libraries used across many different types of applications, or users preferred analysis views can be saved and reused across analysis processes.

Figure 5:
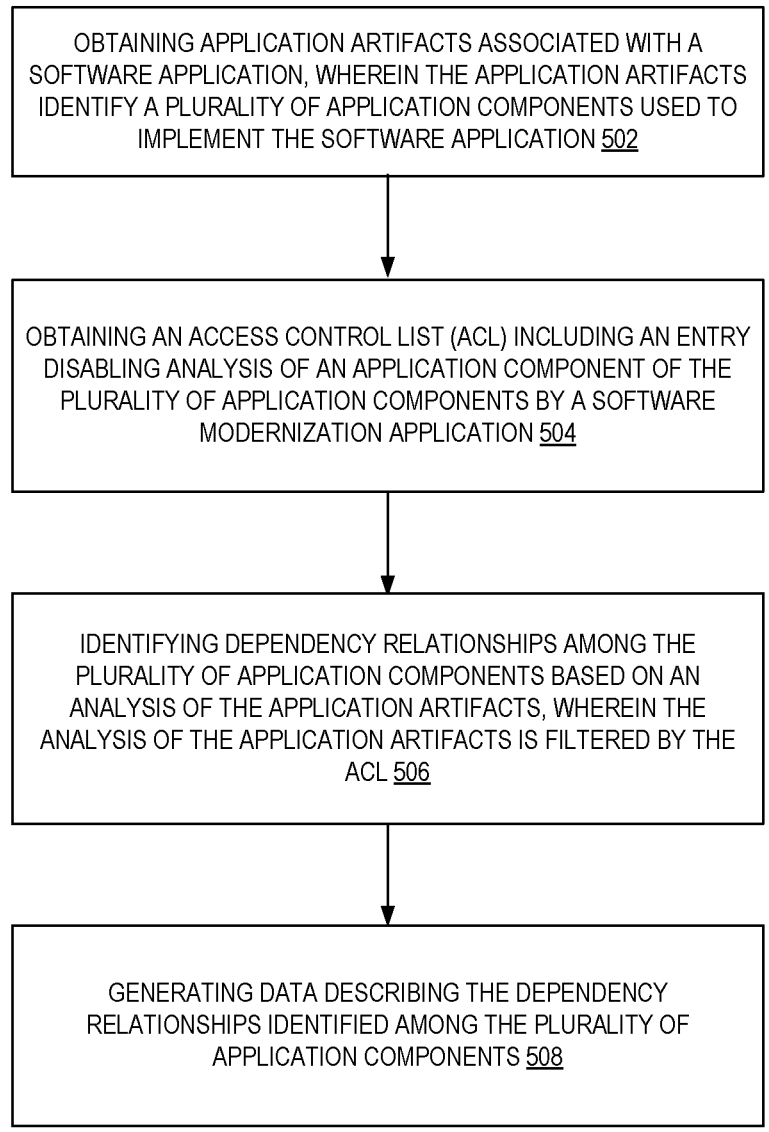
FIG. 5 is a flow diagram illustrating operations of a method for using ACLs to filter the analysis and results display of software applications by a software modernization system according to some embodiments.

FIG. 5 is a flow diagram illustrating operations 500 of a method for using ACLs to filter the analysis and results display of software applications by a software modernization system according to some embodiments according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the modernization service 102, modernization agent 130, or other components or combinations thereof of the other figures.

The operations 500 include, at block 502, obtaining application artifacts associated with a software application, wherein the application artifacts identify a plurality of application components used to implement the software application.

The operations 500 further include, at block 504, obtaining an access control list (ACL) including an entry disabling analysis of an application component of the plurality of application components by a software modernization application.

The operations 500 further include, at block 506, identifying dependency relationships among the plurality of application components based on an analysis of the application artifacts, wherein the analysis of the application artifacts is filtered by the ACL.

The operations 500 further include, at block 508, generating data describing the dependency relationships identified among the plurality of application components.

In some embodiments, the ACL is a first ACL, the entry is a first entry, and the application component is a first application component, and the operations further include: generating a graph model representing the dependency relationships among the plurality of application components; obtaining a second ACL including a second entry denying display of a second application component of the plurality of application components; and causing display of a graphical user interface (GUI) including a graphical representation of the graph model without displaying a node corresponding to the second application component.

In some embodiments, the application component is a first application component and the entry is a first entry, and the operations further include: generating a graph model representing the dependency relationships among the plurality of application components; causing display of a graphical user interface (GUI) including a graphical representation of the graph model without displaying a node corresponding to the second application component; receiving input requesting to hide a node of the graph model corresponding to a second application component of the application components; adding a second entry to the ACL disabling display of the second application component to obtain an updated ACL; and storing the updated ACL.

In some embodiments, each of the application components corresponds to one of: a package, file, a class, a method, or a data object.

In some embodiments, the application components are hierarchically organized, and wherein disabling analysis of the particular application component includes disabling analysis of application components organized hierarchically under the particular application component.

In some embodiments, the application component corresponds to a standard or third party library used by the software application.

In some embodiments, the software application is a first software application associated with first application artifacts and a first plurality of application components, and the operations further include: obtaining second application artifacts associated with a second software application, wherein the second application artifacts are associated with a second plurality of application components; and identifying dependency relationships among the second plurality of application components based on an analysis of the second application artifacts, wherein the analysis of the second application artifacts is filtered by the ACL.

In some embodiments, the operations further include identifying a programming language or framework associated with the application artifacts; and selecting the ACL based on the programming language or framework.

In some embodiments, the operations further include identifying a plurality of subunits of the software application based on the data describing the dependency relationships identified among the plurality of components, wherein each subunit of the plurality of subunits represents a component of the software application that can be implemented as an independently deployable component of the software application.

In some embodiments, the ACL is a first ACL, and wherein the method further comprises dynamically analyzing execution of the software application based on a second ACL, wherein the second ACL identifies at least one application component to be ignored during dynamic analysis.

In some embodiments, the operations further include receiving, by a modernization service of a cloud provider network, a request to analyze the software application, wherein the request identifies the ACL; and sending, to a modernization agent located in a user computing environment, instructions to analyze the software application based on the ACL.

In some embodiments, the application artifacts are obtained by a modernization service of a cloud provider network, and wherein computing resources of the cloud provider network are used to identify the dependency relationships among the plurality of application components and to generate the data describing the dependency relationships among the plurality of application components.

Figure 6:
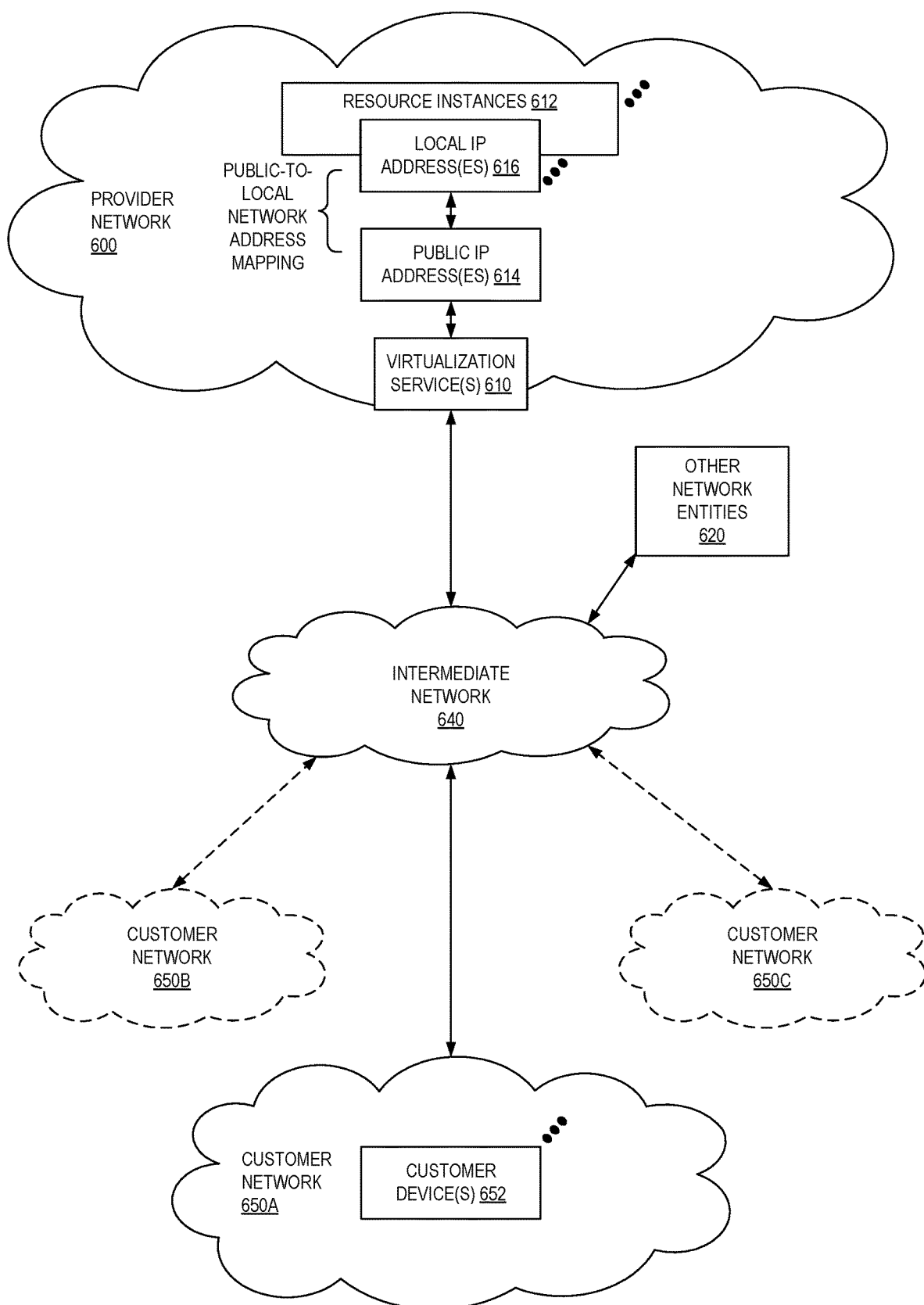
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
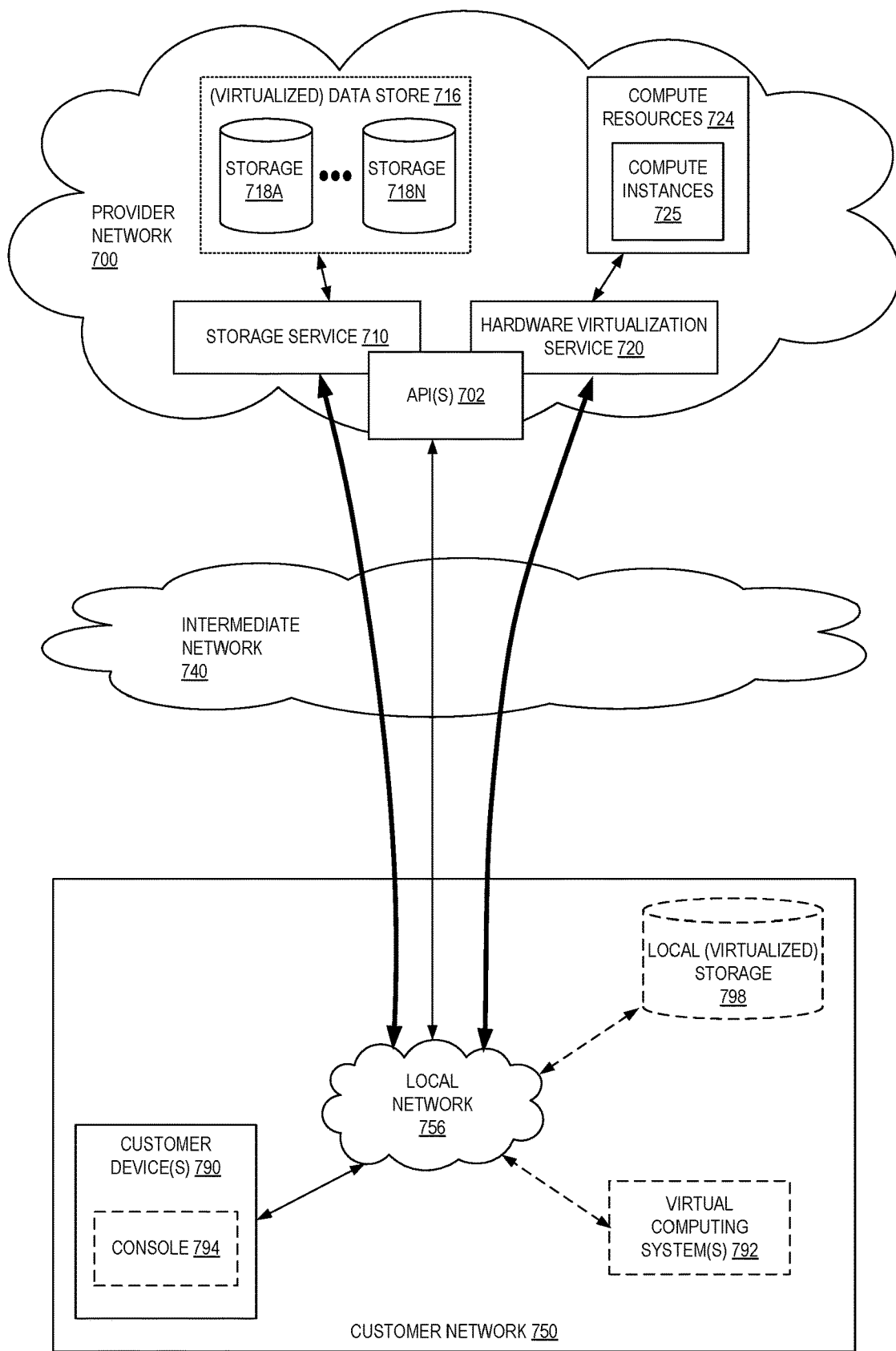
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 898.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
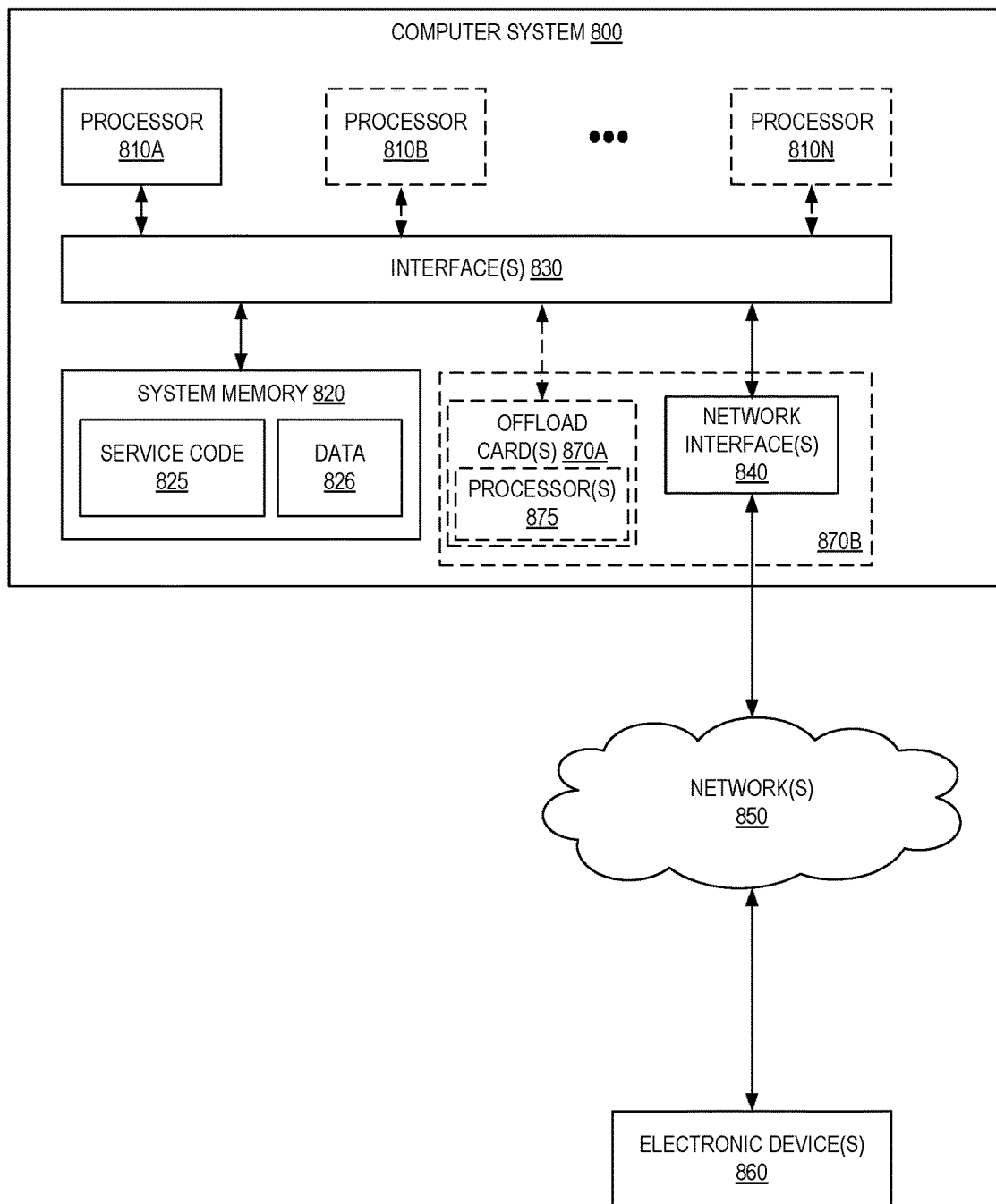
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 (e.g., executable to implement, in whole or in part, the modernization service 102, modernization agent 130, and other components of the figures) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining application artifacts associated with a software application, wherein the application artifacts include source code files, bytecode files, or intermediate language files, and wherein the source code files, bytecode files, or intermediate language files identify a plurality of application components each corresponding to one of a package, a file, a class, a method, or a data object;
generating a graph model representing the software application by identifying a plurality of dependency relationships among the plurality of application components, wherein the graph model includes:
a plurality of nodes each representing an application component of the plurality of application components, and
a plurality of edges each representing a dependency relationship of the plurality of dependency relationships between two application components of the plurality of application components;
obtaining an access control list (ACL) including an entry disabling display of a particular application component of the plurality of application components; and causing display of a graphical user interface (GUI) including a graphical representation of the graph model without displaying a node corresponding to the particular application component.

2. The computer-implemented method of claim 1, wherein the ACL is a first ACL and the entry is a first entry, and wherein the method further comprises:
obtaining a second ACL including a second entry denying analysis of a second particular application component of the plurality of application components; and
wherein generating the graph model representing the software application includes ignoring the second particular application component during analysis.

3. The computer-implemented method of claim 1, wherein the particular application component is a first particular application component and the entry is a first entry, and wherein the method further comprises:
receiving input requesting to hide a node of the graph model corresponding to a second particular application component of the plurality of application components;
adding a second entry to the ACL disabling display of the second particular application component to obtain an updated ACL; and
storing the updated ACL.

4. A computer-implemented method comprising:
obtaining application artifacts associated with a software application, wherein the application artifacts identify a plurality of application components used to implement the software application;
obtaining an access control list (ACL) including an entry disabling analysis of an application component of the plurality of application components by a software modernization application;
identifying dependency relationships among the plurality of application components based on an analysis of the application artifacts, wherein the analysis of the application artifacts is filtered by the ACL; and
generating data describing the dependency relationships identified among the plurality of application components.

5. The computer-implemented method of claim 4, wherein the ACL is a first ACL, the entry is a first entry, and the application component is a first application component, and wherein the method further comprises:
generating a graph model representing the dependency relationships among the plurality of application components;
obtaining a second ACL including a second entry denying display of a second application component of the plurality of application components; and
causing display of a graphical user interface (GUI) including a graphical representation of the graph model without displaying a node corresponding to the second application component.

6. The computer-implemented method of claim 4, wherein the application component is a first application component and the entry is a first entry, and wherein the method further comprises:
generating a graph model representing the dependency relationships among the plurality of application components;
receiving input requesting to hide a node of the graph model corresponding to a second application component of the plurality of application components;
causing display of a graphical user interface (GUI) including a graphical representation of the graph model without displaying a node corresponding to the second application component;
adding a second entry to the ACL disabling display of the second application component to obtain an updated ACL; and
storing the updated ACL.

7. The computer-implemented method of claim 4, wherein each of the application components corresponds to one of: a package, file, a class, a method, or a data object.

8. The computer-implemented method of claim 4, wherein the application components are hierarchically organized, and wherein disabling analysis of the application component includes disabling analysis of application components organized hierarchically under the application component.

9. The computer-implemented method of claim 4, wherein the application component corresponds to a standard or third party library used by the software application.

10. The computer-implemented method of claim 4, wherein the software application is a first software application associated with first application artifacts and a first plurality of application components, and wherein the method further comprises:
obtaining second application artifacts associated with a second software application, wherein the second application artifacts are associated with a second plurality of application components; and
identifying dependency relationships among the second plurality of application components based on an analysis of the second application artifacts, wherein the analysis of the second application artifacts is filtered by the ACL.

11. The computer-implemented method of claim 4, further comprising:
identifying a programming language or framework associated with the application artifacts; and
selecting the ACL based on the programming language or framework.

12. The computer-implemented method of claim 4, further comprising identifying a plurality of subunits of the software application based on the data describing the dependency relationships identified among the plurality of application components, wherein each subunit of the plurality of subunits represents a component of the software application that can be implemented as an independently deployable component of the software application.

13. The computer-implemented method of claim 4, wherein the ACL is a first ACL, and wherein the method further comprises dynamically analyzing execution of the software application based on a second ACL, wherein the second ACL identifies at least one application component to be ignored during dynamic analysis.

14. The computer-implemented method of claim 4, further comprising:
receiving, by a modernization service of a cloud provider network, a request to analyze the software application, wherein the request identifies the ACL; and
sending, to a modernization agent located in a user computing environment, instructions to analyze the software application based on the ACL.

15. The computer-implemented method of claim 4, wherein the application artifacts are obtained by a modernization service of a cloud provider network, and wherein computing resources of the cloud provider network are used to identify the dependency relationships among the plurality of application components and to generate the data describing the dependency relationships among the plurality of application components.

16. A system comprising:
a first one or more electronic devices to implement a software modernization service in a cloud provider network, the software modernization service including instructions that upon execution cause the software modernization service to:
receive an application programming interface (API) request to request to analyze a software application, wherein the request identifies an access control list (ACL), wherein the ACL includes an entry disabling display of a particular application component of a plurality of application components of the software application,
send instructions to a software agent running in a user computing environment to analyze the software application, wherein the instructions identify the ACL,
receive analysis results from the software agent, and
cause display of a graphical user interface (GUI) including a graphical representation of a graph model without a node corresponding to the particular application component; and
a second one or more electronic devices to implement a software agent, the software agent including instructions that upon execution cause the software agent to:
obtain application artifacts associated with a software application, wherein the application artifacts identify a plurality of application components used to implement the software application,
obtain an access control list (ACL) including an entry disabling analysis of an application component of the plurality of application components by a software modernization application,
identify dependency relationships among the plurality of application components based on an analysis of the application artifacts, wherein the analysis of the application artifacts is filtered by the ACL,
generate analysis results describing the dependency relationships identified among the plurality of application components, and
send the analysis results to the software modernization service.

17. The system of claim 16, wherein the ACL is a first ACL, the entry is a first entry, and the application component is a first application component, and wherein the software agent further includes instructions that upon execution cause the software agent to:
generate the graph model representing the dependency relationships among the plurality of application components;
obtain a second ACL including a second entry denying display of a second application component of the plurality of application components; and
cause display of a graphical user interface (GUI) including a graphical representation of the graph model without displaying a node corresponding to the second application component.

18. The system of claim 16, wherein the application component is a first application component and the entry is a first entry, and wherein the software agent further includes instructions that upon execution cause the software agent to:
generate a graph model representing the dependency relationships among the plurality of application components;
receive input requesting to hide a node of the graph model corresponding to a second application component of the plurality of application components;
cause display of a graphical user interface (GUI) including a graphical representation of the graph model without displaying a node corresponding to the second application component;
add a second entry to the ACL disabling display of the second application component to obtain an updated ACL; and
store the updated ACL.

19. The system of claim 16, wherein each of the application components corresponds to at least one of a package, a file, a class, a method, or a data object.

20. The system of claim 16, wherein the application components are hierarchically organized, and wherein disabling analysis of the particular application component includes disabling analysis of application components organized hierarchically under the particular application component.

* * * * *